US005914081A

United States Patent [19]

Shevchuk

[11] Patent Number: 5,914,081

[45] Date of Patent: Jun. 22, 1999

[54] QUICK MOLD PROTOTYPING

[75] Inventor: George J. Shevchuk, Old Bridge, N.J.

[73] Assignee: Lucent Technologies Inc., Murray Hill, N.J.

[21] Appl. No.: 08/811,684

[22] Filed: Mar. 5, 1997

[51] Int. Cl.[6] .............................. B29C 33/40; B28B 7/02

[52] U.S. Cl. .......................... 264/219; 249/155; 425/175; 425/DIG. 30

[58] Field of Search ............................ 264/219; 249/155; 425/175, DIG. 30

[56] References Cited

U.S. PATENT DOCUMENTS

| | | | |
|---|---|---|---|
| 3,363,875 | 1/1968 | Hedgewick et al. | 249/117 |
| 4,799,785 | 1/1989 | Keates et al. . | |
| 4,956,924 | 9/1990 | Hu | 33/56.1 |
| 5,168,635 | 12/1992 | Hoffman | 33/56.1 |
| 5,340,433 | 8/1994 | Crump . | |
| 5,402,351 | 3/1995 | Batchelder et al. . | |
| 5,513,972 | 5/1996 | Schroeder et al. | 425/175 |

OTHER PUBLICATIONS

J. S. Hirschhorn, Introduction to Powder Metallurgy, (1976) at 244–5.

Disston "Copy Cat" package instruction panel.

*Primary Examiner*—Jill L. Heitbrink
*Assistant Examiner*—Suzanne E. Mason

[57] ABSTRACT

A method of making a mold for a given object includes forming a wire stack of elongated wire elements and aligning first ends of the wire elements to define a first end surface of the stack, displacing selected wire elements with respect to the first end surface of the stack by determined amounts in the longitudinal direction of the elements according to a shape of the object to be molded, and then fixing the wire elements of the stack from movement relative to one another after the wire element displacing step. A mold surface for the given object is thus defined according to the first end surface of the wire stack.

7 Claims, 4 Drawing Sheets

CAVITY INSERT DESIGN (CAD)

CORE INSERT DESIGN (CAD)

CAVITY

CORE

QUICK MOLD PROTOTYPING

BACKGROUND OF THE INVENTION

1. Field of the Invention

The present invention relates generally to molding techniques, and particularly to a method of molding an object whose shape may be defined by a computing system for prototype applications.

2. Discussion of the Known Art

Methods of making three-dimensional objects based on a computer-aided design (CAD) or a computer-aided machining (CAM) process are known generally. See, for example, U.S. Pat. No. 5,340,433 (Aug. 23, 1994), disclosing a technique wherein three-dimensional objects are produced by depositing repeated layers of solidifying material on a base member. See also U.S. Pat. No. 5,402,351 (Mar. 28, 1995) which discloses a technique for fabricating a three-dimensional object according to a computer-generated object definition stored in a memory.

U.S. Pat. No. 4,799,785 (Jan. 24, 1989) describes a probe for measuring the contour of the cornea of an eye, using a bundle of slidable pins having a forward end adapted to conform with the surface of the cornea. A so-called contour gauge sold by the Disston Company of Danville, Va., has a number of wire probes supported in a common plane by a flat center bar for tight sliding movement perpendicular to the bar axis. Two-dimensional contours can be copied for purposes of fitting tile or carpet against door casings, moldings and bath fixtures, by urging one side end of the probes against the contour to displace the probes accordingly, removing the gauge, and copying the contour of the ends of the displaced probes.

An amusement device is also known including a tightly-packed array of probes of equal length. The device resembles a small "bed of nails" that reproduces the shape of a hand or other object pressed against one end of the array to displace the "nails" by varying amounts.

As far as is known, no technique exists by which molds can be produced for an object of a desired shape, by using an array of slidable wires or probes.

SUMMARY OF THE INVENTION

According to the invention, a method of producing a mold for an object having a defined shape, comprises forming a wire stack of elongated wire elements and aligning first ends of the wire elements to define a first end surface of the stack, displacing selected wire elements with respect to the first end surface of the stack by determined amounts in the longitudinal direction of the elements according to a shape of a given object to be molded, fixing the wire elements of the stack from movement relative to one another after said wire element displacing step, and defining a mold surface for the given object according to the first end surface of the wire stack.

For a better understanding of the invention, reference is made to the following description taken in conjunction with the accompanying drawing, and the scope of the invention will be pointed out by the appended claims.

DETAILED DESCRIPTION OF THE INVENTION

Figure 1:
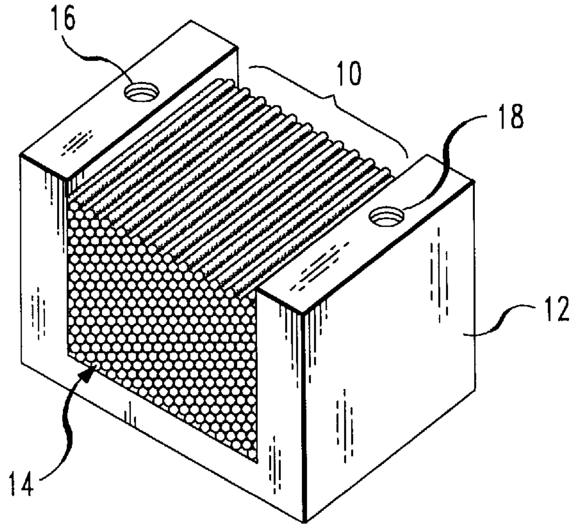
FIG. 1 is a perspective view of a number of rigid wire elements or probes aligned next to one another in a frame to form a wire stack.

FIG. 1 is a perspective view showing a number of rigid elongate wire elements or probes 10 packed next to one another inside a generally U-shaped frame 12 to form a wire stack 14. Frame 12 has openings 16, 18 at its free ends for receiving fastening members described below in connection with FIG. 2.

The wire elements 10 are preferably of equal length and may be made of stainless steel or other strong, corrosion resistant material. Also, the wire elements 10 preferably have a cross-section suitable for packing so that small gaps or voids are formed between adjacent wire elements (see FIG. 3), and the elements 10 are packed inside the frame 12 so that their front ends as viewed in FIG. 1 preferably lie in a common plane.

Figure 2:
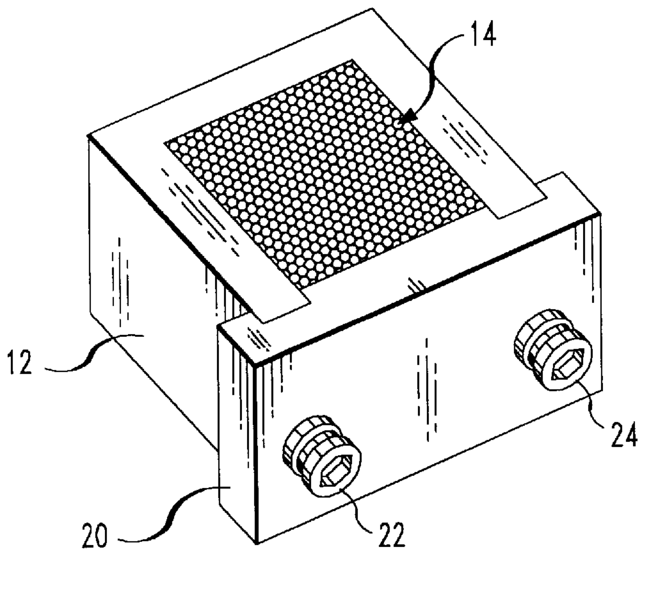
FIG. 2 is a perspective view of the wire stack with its front end in FIG. 1 facing upward in FIG. 2, and showing a clamping bar for bunching the wire elements against one another inside the frame.

FIG. 2 shows the wire stack 14 with its front end in FIG. 1 facing upward in FIG. 2, and a clamping bar 20 for urging the wire elements of the stack against one another inside the frame 12. Clamping bar 20 is fastened to the free ends of the frame 12 by a pair of threaded screw members 22, 24 which engage the openings 18, 16 shown in FIG. 1. Preferably, the wire elements are clamped or bunched with a force sufficient to allow a selected element or group of elements 10 to be displaced, as discussed below, while other elements adjacent to the selected ones remain stationary.

Figure 3:
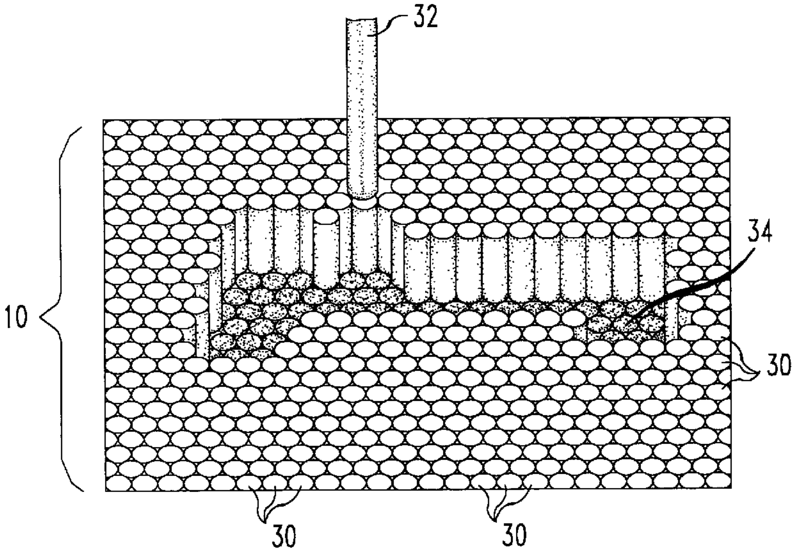
FIG. 3 is an enlarged view of part of the top surface of the wire stack in FIG. 2, with selected wire elements displaced downward from a top end surface of the stack by a tool bit.

FIG. 3 is an enlarged view of the top surface of the wire stack 14 in FIG. 2. In the disclosed embodiment, the wire elements 10 have circular cross-sections so that adjacent elements contact one another only tangentially and gaps are formed between adjacent elements. These gaps extend along the lengths of the adjacent elements from the top surface of the stack 14 shown in FIG. 3, to a bottom surface of the stack (see FIG. 10).

Also shown in FIG. 3 is a working end of a reciprocating plunger or tool bit 32. The bit 32 is, for example, mounted from a carriage (not shown in FIG. 3) above the top surface of the wire stack 14 and is adapted to move in a direction transverse to the axes of the wire elements 10 of the stack. The tool bit 32 has an axis of working movement that is parallel with the axes of the individual wire elements 10. The tool bit 32 and its carriage are part of a computer controlled system such as, for example, the Vanguard VMC available from Hermes Inc., Duluth, Ga. Using conventional machine control programming in the computing system, a surface contour 34 of the part to be molded is reproduced in the top surface of the wire stack 14 by causing the tool bit 32 to traverse over the top surface, and to travel axially a certain distance when located above a selected element or group of elements 10. After striking the top ends 30 of the selected elements, the tool bit urges the elements downward by a determined amount as viewed in FIG. 3.

Thus, a desired geometry for a mold surface is stored in a computing system that controls the movement of the tool bit 32. The bit 32 is moved across the top surface of the wire stack 14 in a determined pattern, and the bit is driven to displace selected ones of the wire elements 10 to reproduce the desired geometry for the mold surface in the top surface of the wire stack 14. This operation may be performed with the wire stack 14 vertically oriented as in FIG. 2 when a relatively small area surface contour is being formed. If the top surface area of the wire stack 14 is relatively large and there is a danger of the wire elements 10 slipping downward, then the process preferably should be carried out with the wire stack 14 horizontally oriented.

Figure 9:
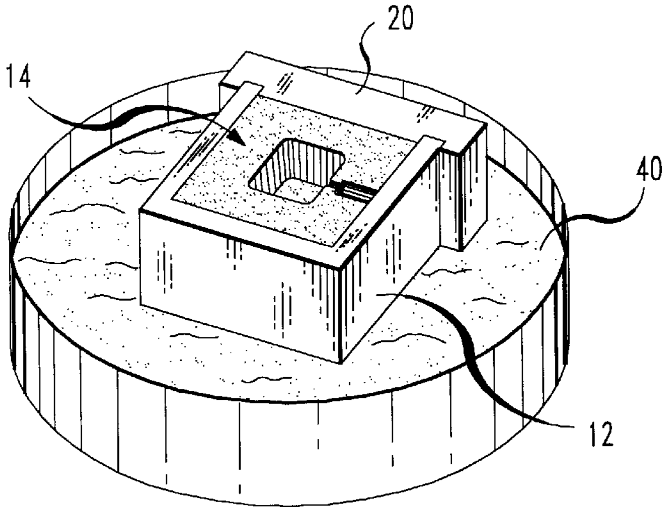
FIG. 9 is a view of the wire stack of FIG. 7 after being worked by the tool bit and having its bottom surface immersed in a melt.

Once a desired mold surface contour is reproduced in the top surface of the wire stack 14, the bottom surface of the stack with the frame 12 and the clamping bar 20 is immersed in molten metal, e.g., a copper alloy melt 40, as shown in FIG. 9.

The molten metal 40 then infiltrates or is wicked to fill completely the gaps between adjacent wire elements of the stack 14. See, e.g., J. S. Hirschhorn, Introduction to Powder Metallurgy (1976), at pages 244–45, all relevant portions of which are incorporated herein by reference. The stack 14, frame 12 and clamping bar 20 are withdrawn from the melt 40, and the melt infiltrated in the stack 14 is allowed to solidify so that the top end surface of the wire stack 14 is smooth, i.e., all gaps between the top ends of the wire elements 10 are filled by the solidified melt 40.

Figure 10:
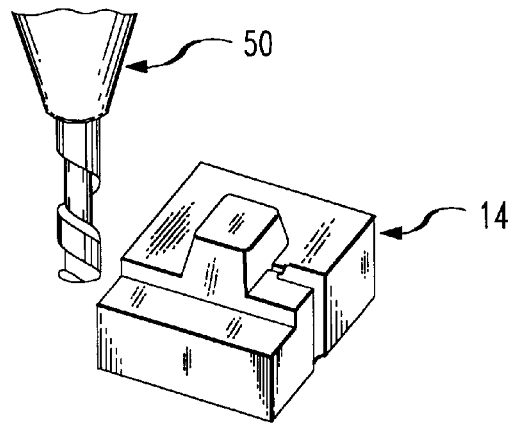
FIG. 10 is a view of the bottom surface of the wire stack in FIG. 9 after being removed from the melt and set up for machining its bottom surface smooth.
Figure 11:
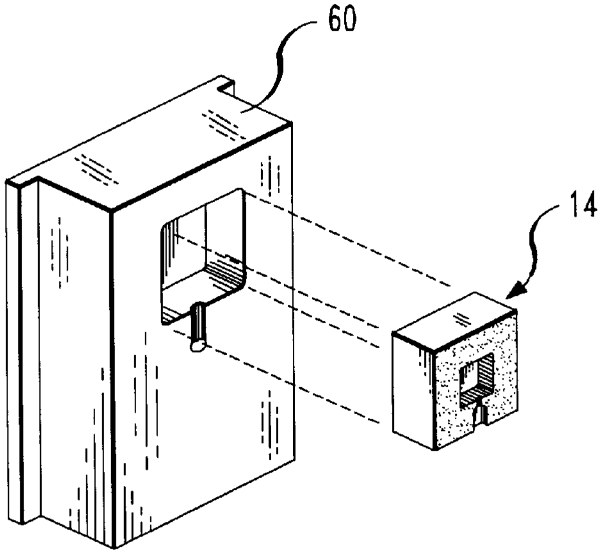
FIG. 11 is a view showing the wire stack of FIG. 10 after machining, being inserted into a mold half.

The clamping bar 20 is then unfastened and the wire stack 14 is removed from the frame 12, and the bottom surface of the stack 14 is machined smooth using, for example, a milling machine and bit 50 as depicted in FIG. 10. The machined wire stack 14 then forms a rigid mold insert, ready for insertion into a mold half 60 of an injection molding machine. See FIG. 11.

Figure 4:
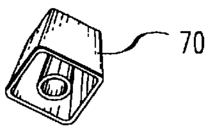
FIG. 4 is a perspective view of a key cap part for which a mold is to be produced according to the invention.
Figure 5:
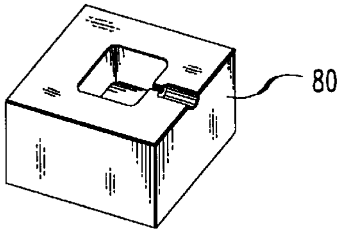
FIG. 5 is a view of a CAD generated mold cavity insert for the key cap of FIG. 4.
Figure 6:
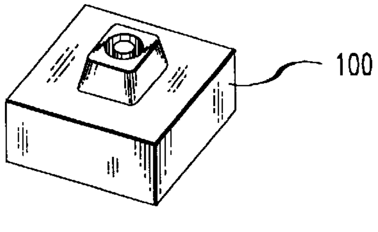
FIG. 6 is a view of a CAD generated mold core insert for the key cap.
Figure 7:
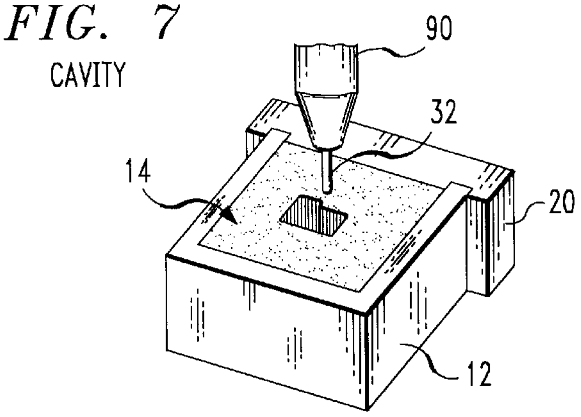
FIG. 7 is a view of a clamped wire stack in which the shape of the cavity insert design of FIG. 5 is reproduced in the top surface of the stack by displacing selected wire elements using a tool bit as in FIG. 3.

An example of the mold forming method of the present invention is now given with reference to FIGS. 4 to 11. Assume a part to be molded is a key cap 70, a bottom view of which is given in FIG. 4. A CAD generated, injection mold cavity insert design 80 shown in FIG. 5, is stored in a computing system. The wire stack 14 with frame 12 and clamping bar 20 are set up in working relation to the tool bit 32 as shown in FIG. 7, and the tool bit and its carriage 90 are controlled by the system to reproduce the contour of the key cap cavity insert 80 (FIG. 5) in the top surface of the wire stack 14 in FIG. 7. Once the cavity insert 80 is completely reproduced in the wire stack 14, the stack is treated as described above with respect to FIGS. 9–11 to form a finished mold cavity insert.

Figure 8:
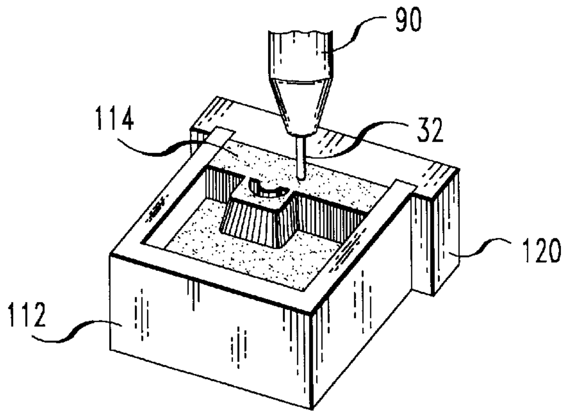
FIG. 8 is a view of a clamped wire stack in which the shape of the core insert design of FIG. 6 is reproduced in the top surface of the stack by displacing selected wire elements using a tool bit as in FIG. 3.

A CAD generated, injection mold core insert design 100, shown in FIG. 6 and corresponding to the key cap 70 in FIG. 4, is also stored in the computing system. Another wire stack 114 with frame 112 and clamping bar 120 are set up in working relation to the tool bit 32 as shown in FIG. 8. The tool bit 32 and its carriage 90 are controlled by the system to reproduce the contour of the key cap core insert 100 (FIG. 6) in the top surface of the wire stack 114 in FIG. 8. Once the core insert 100 is fully reproduced in the wire stack 114, the stack is treated in a manner similar to the stack 14 in FIGS. 9–11 to form a finished core insert for a mold half of the injection molding machine.

The foregoing procedures are directed to creating prototype parts mold inserts in a positive or direct sense. Once a contour in reproduced in the wire stack 14 (or 114) and the wire elements 10 of the stack are fixed by infiltration of the molten metal 40 between them, the wire stack can not practically be reused to make a different mold insert. Since it may not always be practical or cost effective to prepare a new wire stack each time another mold insert is to be made, an alternative procedure would use one wire stack to form a "master" for casting a mold insert. One preferred material for the mold insert is "Devcon" High Temperature Mold Maker C-1 epoxy.

Using the procedure described above, a wire stack such as the stack 14 would be prepared as a negative of a desired mold insert. The space within the wire stack's frame would then be filled with the mold-making material, the material cured, and removed. The wire stack would therefore remain available for reuse many times.

Objects suited for molding using the presently disclosed method include, without limitation, key caps, connector housings, parts and equipment covers, and any other object capable of injection molding using molds whose sizes are limited only by the size attainable for the corresponding wire stacks in the present method.

While the foregoing description represents preferred embodiments of the invention, it will be obvious to those skilled in the art that various changes and modifications may be made, without departing from the true spirit and scope of the invention which is pointed out by the following claims.

What I claim is:

1. A method of making a mold for a given object, comprising:

forming a wire stack of elongated wire elements having circular cross-sections by aligning the wire elements next to one another inside a frame;

aligning first ends of the wire elements to define a first end surface of the stack;

clamping the wire elements inside the frame with a certain clamping force so that adjacent elements contact one another only tangentially thus forming gaps between adjacent elements, said gaps extending along the lengths of the adjacent elements from the first end surface of the wire stack to a second end surface opposite the first end surface;

wherein said certain clamping force is such as to allow selected wire elements to be displaced in response to an axially directed force applied at an end surface of the stack to the selected elements, while elements adjacent the selected elements remain stationary with respect to the first end surface;

displacing the selected wire elements with respect to the first end surface of the stack by determined amounts in the axial direction of the elements according to a shape of a given object to be molded, by moving a tool bit over an end surface of the stack and causing the tool bit to travel a certain distance in a direction parallel to the axes of the wire elements when the tool bit is located above the selected elements, and to strike the selected elements thus applying said axially directed force:

fixing the wire elements of the stack from movement relative to one another after said wire element displacing step by immersing the second end surface of the wire stack in a melt, infiltrating the melt through the gaps between the elements from the second end surface to the first end surface of the stack and allowing the melt to solidify; and defining a mold surface for the given object according to the first end surface of the wire stack.

2. The method of claim 1, wherein the wire stack forming step includes aligning the first ends of the wire elements substantially in a common plane.

3. The method of claim 1, wherein the wire element displacing step includes displacing the wire elements according to a positive shape of a mold for the object to be molded.

4. The method of claim 1, wherein the wire element displacing step includes displacing the wire elements according to a negative shape of a mold for the object to be molded.

5. The method of claim 1, including performing the wire element displacing step under the control of a computing system.

6. The method of claim 5, including defining the shape of the object to be molded using said computing system.

7. The method of claim 1, wherein said wire element displacing step comprises displacing selected wire elements according to a contour of a mold cavity insert and a mold core insert for the given object.

* * * * *